US006649721B1

(12) United States Patent
Dyllick-Brenzinger et al.

(10) Patent No.: US 6,649,721 B1
(45) Date of Patent: Nov. 18, 2003

(54) DEFOAMER AND/OR DEAERATOR BASED ON OIL-IN-WATER DISPERSIONS

(75) Inventors: Rainer Dyllick-Brenzinger, Weinheim (DE); Günther Glas, Meckenheim (DE); Primoz Lorencak, Ludwigshafen (DE); Robert Heger, Heidelberg (DE); Günter Oetter, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/762,298

(22) PCT Filed: Jul. 20, 1999

(86) PCT No.: PCT/EP99/05168

§ 371 (c)(1),
(2), (4) Date: Feb. 8, 2001

(87) PCT Pub. No.: WO00/08254

PCT Pub. Date: Feb. 17, 2000

(30) Foreign Application Priority Data

Aug. 8, 1998 (DE) .......................................... 198 35 968

(51) Int. Cl.$^7$ ...................... C08F 120/68; C08F 220/68; C08F 112/08
(52) U.S. Cl. .................... 526/274; 526/287; 526/317.1; 526/318; 526/319; 526/347.1
(58) Field of Search .......................... 516/99; 526/317.1, 526/318, 319, 347.1, 287, 274

(56) References Cited

U.S. PATENT DOCUMENTS

| 5,326,499 A | * | 7/1994 | Wegner et al. ............... 162/179 |
| 5,679,286 A | * | 10/1997 | Wollenweber ............... 516/132 |
| 5,700,351 A | * | 12/1997 | Schuhmacher et al. ...... 162/179 |

FOREIGN PATENT DOCUMENTS

| DE | 30 01 387 | | 7/1981 |
| DE | 32 24 528 | | 1/1984 |
| EP | 0 149 812 A2 | * | 12/1984 |
| EP | 0 149 812 | | 7/1985 |
| EP | 0 531 713 | | 3/1993 |
| EP | 0 597 320 | | 5/1994 |
| EP | 662 172 | | 7/1995 |
| EP | 696 224 | | 2/1996 |
| EP | 0 732 134 | | 9/1996 |
| WO | WO 94/08091 | | 4/1994 |
| WO | WO 94/25137 | | 11/1994 |

\* cited by examiner

*Primary Examiner*—Robert Harlan
(74) *Attorney, Agent, or Firm*—Oblon, Spivak, McClelland, Maier & Neustadt, P.C.

(57) ABSTRACT

Antifoams and/or deaerators are based on oil-in-water emulsions which contain, in the hydrophobic oil phase, at least one compound effective as an antifoam and/or deaerator and, if required, further components, the oil-in-water emulsions containing from 0.01 to 3% by weight of a water-soluble, amphiphilic copolymer having acid groups or of a water-soluble salt thereof as a stabilizer.

13 Claims, No Drawings

DEFOAMER AND/OR DEAERATOR BASED ON OIL-IN-WATER DISPERSIONS

The present invention relates to antifoams and/or deaerators based on oil-in-water dispersions, which contain, in the hydrophobic oil phase, at least one compound effective as an antifoam and/or deaerator and, if required, further components.

EP-A-0 149 812 discloses antifoams which are based on oil-in-water emulsions and contain from 0.05 to 5% by weight of a high molecular weight, water-soluble homo- or copolymer of acrylic acid, methacrylic acid, acrylamide or methacrylamide as stabilizer. The oil phase of the emulsions contains, for example as an antifoam compound, a $C_{12}$–$C_{26}$-alcohol or a distillation residue which is obtained in the preparation of alcohols having a relatively high number of carbon atoms by oxo synthesis or by the Ziegler process and which may furthermore be alkoxylated. Further antifoam substances are, for example, fatty esters of $C_{12}$–$C_{22}$-carboxylic acids with a monohydric to trihydric $C_1$- to $C_{18}$-alcohol and/or hydrocarbons having a boiling point of above 200° C. or fatty acids of 12 to 22 carbon atoms. The mean particle diameter of the oil phase of the oil-in-water emulsions is from 0.5 to 15 μm.

DE-A-30 01 387 discloses aqueous emulsifier-containing oil-in-water emulsions which contain relatively high-melting aliphatic alcohols and contain hydrocarbons which are liquid at room temperature. The oil phase of the oil-in-water emulsions can, if required, also contain further components acting as antifoams, for example relatively high-melting nonaromatic hydrocarbons, fatty acids or derivatives thereof, for example fatty esters, beeswax, carnauba wax, Japan wax and montan wax.

EP-A-0 531 713 discloses antifoams which are based on oil-in-water emulsions and whose oil phase contains an alcohol of at least 12 carbon atoms, fatty esters of alcohols of at least 22 carbon atoms and $C_1$- to $C_{36}$-carboxylic acids, or fatty esters of $C_{12}$- to $C_{22}$-carboxylic acids with mono-hyric to trihydric $C_1$- to $C_{18}$-alcohols or a hydrocarbon having a boiling point of above 200° C. or fatty acids of 12 to 22 carbon atoms in combination with polyglyceryl esters, which are obtainable by at least 20% esterification of polyglycerol mixtures with at least one fatty acid of 12 to 36 carbon atoms. These oil-in-water emulsions, too, are stabilized with the aid of a water-soluble emulsifier.

EP-A-0 662 172 discloses antifoams which are based on water-in-oil emulsions and are used as antifoams, for example in paper mills and are still sufficiently effective even at relatively high temperatures of the water circulation. Such antifoams contain, in the oil phase, (a) fatty esters of $C_{12}$- to $C_{22}$-carboxylic acids with monohydric to trihydric $C_1$- to $C_{22}$-alcohols, (b) polyglyceryl esters which are obtainable by at least 20% esterification of polyglycerols which have at least 2 glycerol units with at least one $C_{12}$- to $C_{36}$-fatty acid and (c) fatty esters of $C_{12}$- to $C_{22}$-carboxylic acids and polyalkylene glycols, the molar mass of the polyalkylene glycols being up to 5000 g/mol. The hydrophobic phase can, if required, contain further components, such as alcohols of at least 12 carbon atoms or hydrocarbons having a boiling point above 200° C. These oil-in-water emulsions are likewise stabilized with the aid of an emulsifier.

EP-A-0 696 224 discloses aqueous antifoam dispersions whose dispersed phase contains fatty alcohols having melting points above 40° C. and ketones having melting points above 45° C. and, if required, natural or synthetic waxes having melting points above 50° C.

EP-A-0 732 134 discloses antifoams and/or deaerators based on oil-in-water emulsions for aqueous media which tend to form foam, the oil phase of the emulsions containing (a) at least one alcohol of at least 12 carbon atoms, a distillation residue which is obtainable in the preparation of alcohols having a relatively high number of carbon atoms by oxo synthesis or by the Ziegler process, or a mixture of said compounds and (b) at least one ester of a sugar alcohol having at least 4 OH groups or at least 2 OH groups and at least one intramolecular ether bond and a fatty acid of at least 20 carbon atoms in a molar ratio of 1 to at least 1, where the free OH groups of these esters may be completely or partly esterified with $C_{12}$- to $C_{18}$-carboxylic acids.

The hydrophobic phase can, if required, contain further antifoam compounds, such as fatty esters of alcohols of at least 22 carbon atoms and $C_1$- to $C_{36}$-carboxylic acids, polyethylene waxes, natural waxes, hydrocarbons having a boiling point of above 200° C. or fatty acid of 12 to 22 carbon atoms.

From 0.1 to 5% by weight of an emulsifier are required for stabilizing the oil-in-water emulsions. The known oil-in-water emulsions have the disadvantage that they separate into a fat phase and a water phase on prolonged storage. Some of the known oil-in-water emulsions even become solid and are therefore unusable for the intended application.

It is an object of the present invention to provide antifoams and/or deaerators based on oil-in-water emulsions where the emulsions are free from high molecular weight polymers having a thickening effect and have a sufficient shelf life.

We have found that this object is achieved, according to the invention, by antifoams and/or deaerators based on oil-in-water emulsions which contain, in the hydrophobic oil phase, at least one compound effective as antifoam and/or deaerator and, if required, further components, if the oil-in-water emulsions contain from 0.01 to 3% by weight of a water-soluble, amphiphilic copolymer having acid groups or of a water-soluble salt thereof as a stabilizer.

Compounds acting as antifoams and/or deaerators are, for example, naturally occurring or synthetically prepared alcohols having at least 12 carbon atoms in the molecule. Examples of such alcohols are myristyl alcohol, cetyl alcohol, stearyl alcohol, palmityl alcohol, tallow fatty alcohol and behenyl alcohol, and synthetically prepared alcohols, such as saturated, straight-chain alcohols obtainable, for example, by the Ziegler process by oxidation of aluminum alkyls. Synthetic alcohols are also obtained by oxo synthesis. These are as a rule alcohol mixtures. The alcohols may contain, for example, up to 48 carbon atoms in the molecule. Very effective antifoams contain, for example, mixtures of at least one $C_{12}$- to $C_{26}$-alcohol and at least one fatty alcohol having 28 to 48 carbon atoms in the molecule, cf. EP-A-0 322 830. Instead of the pure alcohols, distillation residues which are obtainable in the preparation of alcohols having a relatively high number of carbon atoms by oxo synthesis or by the Ziegler process may also be used as antifoam compounds. Further compounds which are suitable as antifoams and/or deaerators are alkoxylated alcohols and alkoxylated distillation residues which are obtained in the preparation of alcohols by oxo synthesis or by the Ziegler process. The alkoxylated compounds are obtainable by reacting the long-chain alcohols or distillation residues with ethylene oxide or with propylene oxide or a mixture of ethylene oxide and propylene oxide. Here, first ethylene oxide and then propylene oxide can be subjected to an addition reaction with the alcohols or the distillation residues, or propylene oxide and then ethylene oxide are subjected to said addition reaction. In general, up to 5 mol of ethylene oxide or propylene oxide are subjected to the addition reaction per OH group of the alcohol. Particularly preferred from the group consisting of the alkoxylated compounds are those reaction products which are prepared by an addition reaction of 1 or 2 mol of ethylene oxide with 1 mol of fatty alcohol or distillation residue.

The abovementioned fatty alcohols having at least 12 carbon atoms in the molecule are generally used together with other compounds likewise acting as antifoams. Such compounds are, for example, fatty esters of $C_{12}$- to $C_{22}$-carboxylic acids with monohydric to trihydric $C_1$–$C_{18}$-alcohols. Fatty acids on which these esters are based, are, for example, lauric acid, myristic acid, palmitic acid, stearic acid, arachidic acid and behenic acid. Palmitic acid or stearic acid is preferably used. Monohydric $C_1$- to $C_{18}$-alcohols, e.g. methanol, ethanol, propanol, butanol, hexanol, dodecanol and stearyl alcohol, or dihydric alcohols, such as ethylene glycol, or trihydric alcohols, e.g. glycerol, may be used for esterifying said carboxylic acids. The polyhydric alcohols may be completely or only partially esterified.

Further compounds having an antifoam and deaerating action are polyglyceryl esters. Such esters are prepared, for example, by esterifying polyglycerols which contain at least 2 glycerol units with at least one $C_{12}$- to $C_{36}$-carboxylic acid. The polyglycerols on which the esters are based are esterified to such an extent that compounds which are virtually no longer soluble in water form. The polyglycerols are obtained, for example, by alkali-catalyzed condensation of glycerol at relatively high temperatures or by reaction of epichlorohydrin with glycerol in the presence of acid catalysts. The polyglycerols usually contain at least 2 to about 30, preferably 2 to 12, glycerol units. Commercial polyglycerols contain mixtures of polymeric glycerols, for example mixtures of diglycerol, triglycerol, tetraglycerol, pentaglycerol and hexaglycerol and possibly polyglycerols having a higher degree of condensation. The degree of esterification of the OH groups of the polyglycerols is from at least 20 to 100, preferably from 60 to 100, %. The long-chain fatty acids used for the esterification may be saturated or ethylenically unsaturated. Suitable fatty acids are, for example, lauric acid, myristic acid, palmitic acid, stearic acid, arachidic acid, behenic acid, oleic acid, hexadecanoic acids, elaidic acid, eicosenoic acids, docosenoic acids, such as erucic acid, and polyunsaturated acids, such as octadecadienoic acids and octadecatrienoic acids, e.g. linoleic acid and linolenic acid, and mixtures of said carboxylic acids. Polyglycerol esters suitable as antifoams are described, for example, in EP-A-0 662 772.

Other compounds which are suitable as antifoams and/or deaerators for aqueous media tending to form foam and which are used either alone or together with at least one alcohol of at least 12 carbon atoms are esters of a sugar alcohol having at least 4 OH groups or at least 2 OH groups and at least one intramolecular ether bond and a fatty acid having at least 20 carbon atoms in the molecule, in a molar ratio of 1 to at least 1, if required the free OH groups of these esters being partially or completely esterified with $C_{12}$- to $C_{18}$-carboxylic acids. Esters of tetritols, pentitols and/or hexitols with fatty acids of at least 22 carbon atoms in a molar ratio of 1 to at least 1.9 are preferably used. Esters of mannitol and/or sorbitol with behenic acid in a molar ratio of 1 to at least 1, preferably 1 to at least 1.9, are particularly preferably used. In addition to the suitable sugar alcohols sorbitol and mannitol, adonitol, arabitol, xylitol, dulcitol, pentaerythritol, sorbitan and erythritol are suitable. Sugar alcohols are understood as meaning the polyhydroxy compounds which are formed from monosaccharides by reduction of the carbonyl function and which themselves are not sugars. It is also possible to use anhydro compounds which are formed from sugar alcohols as a result of intramolecular elimination of water. Particularly effective antifoams and/or deaerators are obtained if sugar alcohols are esterified with $C_{22}$- to $C_{30}$-fatty acids. If the sugar alcohols are only partially esterified with a fatty acid of at least 20 carbon atoms, the unesterified OH groups of the sugar alcohol can be esterified with another carboxylic acid, for example a $C_{12}$- to $C_{18}$-carboxylic acid may be used. Esters of this type are described in EP-A-0 732 134.

Further compounds suitable as antifoams and/or deaerators are ketones having melting points above 45° C. They are generally used together with fatty alcohols whose melting points are above 40° C. Such antifoam mixtures are disclosed in EP-A-0 696 224, mentioned in connection with the prior art.

Other compounds which reinforce the activity of long-chain alcohols as antifoams and are therefore also used in antifoam mixtures are, for example, polyethylene waxes having a molar mass of at least 2000 and natural waxes, such as beeswax or carnauba wax.

A further component of antifoam mixtures are hydrocarbons having a boiling point above 200° C. (determined at atmospheric pressure). Preferably used hydrocarbons are liquid paraffins, for example the commercially available paraffin mixtures which are also referred to as white oil. Paraffins whose melting point is, for example, above 50° C. are also suitable.

The abovementioned compounds acting as antifoams and/or deaerator are used either alone or as a mixture with one another for the preparation of antifoam and deaerator dispersions. They may be mixed with one another in any desired ratio. The mixing of the compounds and also the emulsification in water are effected at relatively high temperatures. The active components which form the oil phase of the antifoam mixture are heated, for example, to above 40° C., for example from 70 to 120° C., and emulsified in water under the action of shear forces, so that oil-in-water emulsions are obtained. Commercial apparatuses are used for this purpose. The particle size of the dispersed hydrophobic phase is, for example, from 0.5 to 15 $\mu$m, preferably from 0.4 to 5 $\mu$m. The finely divided oil-in-water emulsions thus obtained are stabilized with water-soluble, amphiphilic copolymers having acid groups or with water-soluble salts of said copolymers. For example, from 0.01 to 3% by weight, based on the total emulsion, of a water-soluble amphiphilic copolymer having acid groups can be added to the oil-in-water emulsion directly after homogenization or the compounds acting as antifoams and/or deaerators can be emulsified in an aqueous solution of a water-soluble, amphiphilic copolymer having acid groups or of a salt thereof. Dispersions having a long shelf life are obtained in this manner after cooling to room temperature. The organic phase dispersed in water accounts, for example, for from 5 to 50, preferably from 10 to 35, % by weight of the oil-in-water dispersions.

After cooling to room temperature, the oil phase dispersed in water becomes solid, so that dispersions which have a long shelf life are obtained.

Antifoam dispersions which contain from 0.01 to 3% by weight of a water-soluble, amphiphilic copolymer having acid groups or of a salt thereof and additionally from 0.01 to 3% by weight of a conventional surfactant usually used for stabilizing oil-in-water dispersions are particularly advantageous. Suitable surfactants are, for example, anionic, cationic or nonionic compounds which are compatible with the other substances of the antifoam dispersion. The surfactants used as a coemulsifier can be used alone or as a mixture with one another. For example, mixtures of anionic and nonionic surfactants can be used for further stabilization of the antifoam dispersions. The surfactants suitable as a coemulsifier are described as a component of antifoam formulations in the literature publications stated in connection with the prior art. Such coemulsifiers are, for example, sodium salts or ammonium salts of higher fatty acids, alkoxylated alkylphenols, oxyethylated unsaturated oils, such as reaction products of 1 mol of castor oil and 30 to 40 mol of ethylene oxide, sulfated ethoxylation products of nonylphenol or octylphenol and their sodium salts or ammonium salts, alkylarylsulfonates, sulfonates of naphthalene and naphthalene condensates, sulfosuccinates and adducts of ethylene oxide and/or propylene oxide with fatty alcohols, polyhydric alcohols, amines or carboxylic acids. Particularly effective coemulsifiers are sulfated alkyldiphenyl oxides, in particular bis-sulfated alkyldiphenyl oxides, such as bis-sulfated dodecyldiphenyl oxide.

The preferred antifoam dispersions are prepared, for example, by a procedure in which the components which form the oil phase are first melted and are then emulsified in water, a water-soluble, amphiphilic copolymer containing acid groups or a salt of said copolymer and at least one of the conventional coemulsifiers described above are added to the still hot emulsion when the emulsified oil droplets are still liquid, and the oil-in-water emulsion is cooled with formation of an oil-in-water dispersion. However, said stabilizers can also be added to the antifoam dispersion after the cooling of the oil-in-water emulsion if the oil droplets have become solid.

A process variant for the preparation of antifoam dispersions having a particularly long shelf life comprises emulsifying the molten oil phase in an aqueous solution of a water-soluble, amphiphilic copolymer containing acid groups and adding at least one coemulsifier to the hot oil-in-water emulsion after emulsification or to the antifoam dispersion after cooling to, for example, room temperature. As has been found, antifoam dispersions which also contain at least one coemulsifier in addition to the stabilizer to be used according to the invention have even less tendency to thicken or cream than those antifoam dispersions which contain only the stabilizer to be used according to the invention.

The novel antifoams and/or aerators contain at least one amphiphilic copolymer of
  (a) hydrophobic monoethylenically unsaturated monomers and
  (b) monoethylenically unsaturated carboxylic acids, monoethylenically unsaturated sulfonic acids, monoethylenically unsaturated phosphonic acids or mixtures thereof.

Suitable hydrophobic monoethylenically unsaturated monomers
  (a) are, for example, styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, isobutene, diisobutene, styrene and acrylates, such as ethyl acrylate, isopropyl acrylate, n-butyl acrylate and sec-butyl acrylate, are preferably used.

The amphiphilic copolymers contain, as hydrophilic monomers,
  (b) preferably acrylic acid, methacrylic acid, maleic acid, maleic anhydride, itaconic acid, vinylsulfonic acid, 2-acrylamidomethylpropanesulfonic acid, styrenesulfonic acid, vinylphosphonic acid or mixtures thereof in polymerized form.

If the amphiphilic copolymers in the form of the free acid are not sufficiently water-soluble, they are used in the form of water-soluble salts; for example, the corresponding alkali metal, alkaline earth metal and ammonium salts are used. These salts are prepared, for example, by partial or complete neutralization of the free acid groups of the amphiphilic copolymers with bases; for example, sodium hydroxide solution, potassium hydroxide solution, magnesium oxide, ammonia or amines, such as triethanolamine, ethanolamine, morpholine, triethylamine or butylamine, are used for the neutralization. The acid groups of the amphiphilic copolymers are preferably neutralized with ammonia or sodium hydroxide solution. The molar mass of the amphiphilic copolymers is, for example, from 1000 to 100,000, preferably from 1500 to 10,000. The acid numbers of the amphiphilic copolymers are, for example, from 50 to 500, preferably from 150 to 300, mg of KOH/g of polymer.

The novel antifoams and/or deaerators contain from 0.01 to 3, preferably from 0.1 to 1, % by weight of an amphiphilic copolymer or of a water-soluble salt of such a copolymer. Particularly preferred antifoams and/or deaerators are those which are stabilized with amphiphilic copolymers, the copolymers containing
  (a) from 95 to 50% by weight of isobutene, diisobutene, styrene or a mixture thereof and
  (b) from 5 to 50% by weight of acrylic acid, methacrylic acid, maleic acid, a half-ester of maleic acid or a mixture thereof
as polymerized units. Particularly preferably used copolymers are those which contain
  (a) from 65 to 85% by weight of styrene,
  (b) from 35 to 15% by weight of acrylic acid, and, if required,
  (c) additionally further monomers
as polymerized units. The copolymers can, if required, contain units of maleic half-esters as polymerized further monomers (c). Such copolymers are obtainable, for example, by copolymerizing copolymers of styrene, diisobutene or isobutene or a mixture thereof with maleic anhydride in the absence of water and reacting the copolymers after the polymerization with alcohols, from 5 to 50 mol % of a monohydric alcohol being used per mol of anhydride groups in the copolymer. Suitable alcohols are, for example, methanol, ethanol, n-propanol, isopropanol, n-butanol, isobutanol and tert-butanol. However, the anhydride groups of the copolymers can also be reacted with polyhydric alcohols such as glycol or glycerol. However, the reaction is continued in this case only until only one OH group of the polyhydric alcohol reacts with the anhydride group. If the anhydride groups of the copolymers are not completely reacted with alcohols, the anhydride groups not reacted with alcohols undergo ring opening as a result of the addition of water.

The present invention also relates to the use of water-soluble amphiphilic copolymers having acid groups or of water-soluble salts thereof as a stabilizer for antifoams and/or deaerators based on oil-in-water dispersions. Although the amphiphilic copolymers are not wetting agents, they stabilize the antifoam dispersions and thus permit the preparation of antifoams and/or deaerators based on oil-in-water dispersions and having a long shelf life.

The novel antifoams and/or deaerators are very effective in aqueous systems which tend to foam both at room temperature and at higher temperatures, for example at about 40° C. They are preferably used as antifoams and/or deaerators for the foam control of aqueous media tending to foam formation, for example in the food industry, in the starch industry and in wastewater treatment plants. Of particular interest, however, is the use of the antifoams and/or deaerators for foam control in pulp digestion, pulp washing, in the beating of paper stock, in papermaking and in the dispersing of pigments for papermaking. In these processes, the temperature of the aqueous medium to be defoamed is generally above 40° C., for example from 45 to 75° C. The novel mixtures based on oil-in-water dispersions act as antifoams and as deaerators. They are also advantageously used in engine sizing and surface sizing. When these mixtures are used in paper stock suspensions, for example, their deaerating action is of primary importance. For example, up to 0.5, preferably from 0.02 to 0.3, % by weight, of the deaerators is used per 100 parts by weight of paper stock in a foam-forming medium.

In the examples which follow, parts and percentages are by weight, unless stated otherwise.

The tendency of the dispersions to cream is determined by the centrifuge test. For this purpose, the dispersion is poured into a 97 mm long centrifuge tube to a height of 75 mm and centrifuged for 30 minutes at 5000 rpm. The larger the amount of water separated off at the bottom, the lower is the stability of the dispersion. The height from the bottom of the centrifuge tube to the fatty phase front is measured.

The deaerating effect is determined with the aid of a Sonica measuring instrument, the amount added to 0.38% strength paper stock suspension at 40° C. being exactly sufficient to give a concentration of 5 ppm, based on the fat phase (active substance), of antifoam. The air content is measured continuously by means of ultrasonic attenuation before the metering of the antifoams and during the first 5 minutes after metering. The air content decreases initially and increases toward the end of the measurement. The tables show in each case the minimum air content of the paper stock suspension in % by volume. This method of measurement is described in TAPPI Journal, 71, (1988), 65–69.

Said paper stock suspension was used in all examples and comparative examples. It contained 1.44% by volume of air before the addition of a deaerator. The tables of the examples show the content of air in % by volume after metering of the deaerators, under the heading deaerating activity. The smaller this number is, the more effective the deaerator is.

EXAMPLE 1

With the aid of an Ultraturrax and of a high-pressure homogenizer from APV Gaulin GmbH, an oil-in-water emulsion is prepared in which the oil phase accounts for 27.3% by weight of the dispersion and has a mean particle size of from 0.9 to 10 µm.

The oil phase consists of the following components:
(a) 552 parts of a fatty alcohol mixture comprising $C_{12}$- to $C_{24}$-alcohols,
(b) 48 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation,
(c) 218.4 parts of glyceryl triesters of $C_{16}$- to $C_{18}$-fatty acids.

The aqueous phase consists of:
2200 parts of demineralized water, 15 parts of a 39% strength aqueous, ammoniacal solution of an amphiphilic copolymer of 27.6 parts of acrylic acid and 72.4 parts of styrene, having an acid number of 225 and a molar mass of 5000 (obtainable under the name Joncryl® 680, S. C. Johnson Polymer).

The components (a) to (c) are first heated to 90° C. and then emulsified in the aqueous phase, heated to 95° C., with high shearing by means of an Ultraturrax for 2 minutes. This emulsion is then emulsified at from 10 to 60 bar by means of a high-pressure homogenizer and, immediately after the emulsification, cooled to room temperature using an ice bath. The dispersions thus obtainable have the properties shown in Table 1. The viscosity was measured immediately after the preparation of the dispersions in a Brookfield viscometer.

TABLE 1

| Pressure [bar] | Viscosity at 20° C. [mPas] | Deaerating activity in % by volume of air | Centrifuge test 5000 rpm in mm | Mean particle size distribution/Fraunhofer diffraction [µm] | Stability +30° C./+5° C. 1 month |
|---|---|---|---|---|---|
| 10 | 20 | 0.26 | 1.3 | 3.1 | low two-phase |
| 20 | 20 | 0.27 | 0.7 | 1.95 | homogeneous |
| 40 | 20 | 0.34 | 0.7 | 1.55 | homogeneous |
| 60 | 20 | 0.38 | 0.7 | 1.3 | homogeneous |

After a storage time of 1 month, all dispersions showed no significant increase in viscosity.

By adding 15 parts of a 45% strength aqueous solution of a coemulsifier based on a bis-sulfated dodecyldiphenyl oxide, it is possible to improve the long-term stability and in particular to prevent an increase in the viscosity under shear conditions.

Comparative Example 1

With the aid of an Ultraturrax and of a high-pressure homogenizer from APV, an oil-in-water emulsion is prepared in which the oil phase accounts for 27.3% by weight of the dispersion and has a mean particle size of from 0.9 to 10 µm.

The oil phase consists of the following components:
(a) 552 parts of a fatty alcohol mixture comprising $C_{12}$- to $C_{24}$-alcohols,
(b) 48 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation,
(c) 218.4 parts of glyceryl triesters of $C_{16}$- to $C_{18}$-fatty acids.

The aqueous phase consists of:
2200 parts of demineralized water, 40 parts of a 45% strength aqueous solution of a bis-sulfated dodecyldiphenyl oxide and 10 parts of an adduct of 12 mol of ethylene oxide with 1 mol of $C_{13}$ alcohol.

The components (a) to (c) are first heated to 90° C. and then emulsified in the aqueous phase, which is at 95° C., with high shearing by means of an Ultraturrax for 2 minutes. This emulsion is then emulsified at from 10 to 60 bar by means of a high-pressure homogenizer and, immediately after the emulsification, cooled to room temperature using an ice bath. The emulsions thus obtainable have the properties shown in Table 2. The viscosity was measured immediately after the preparation in a Brookfield viscometer.

TABLE 2

| Pressure [bar] | Viscosity at 20° C. [mPas] | Deaerating activity in % by volume of air | Centrifuge test 5000 rpm in mm | Mean particle size distribution/Fraunhofer diffraction [μm] | Stability +30° C./ +5° C. 1 month |
|---|---|---|---|---|---|
| 10 | 200 | 0.27 | 15 | 4.1 | creams |
| 20 | 500 | 0.28 | 14 | 2.6 | creams |
| 40 | Paste | | | 5.3 ** | |
| 60 | Paste | | | 10.3 ** | |

Comparative Example 2

With the aid of an Ultraturrax, an oil-in-water emulsion is prepared in which the oil phase accounts for 27.3% by weight of the dispersion and has a mean particle size of from 0.9 to 10 μm.

The oil phase consists of the following components:

(a) 92 parts of a fatty alcohol mixture comprising $C_{12}$- to $C_{24}$-alcohols (b) 8 parts of a polyglyceryl ester which is obtainable by esterifying a polyglycerol oil mixture comprising 27% of diglycerol, 44% of triglycerol, 19% of tetraglycerol and 10% of polyglycerols having a higher degree of condensation, (c) 28 parts of glyceryl triesters of $C_{16}$- to $C_{18}$-fatty acids and (d) 8.4 parts of behenyl alcohol ($C_{20}$–$C_{24}$-alcohol).

The aqueous phase consists of:

360 parts of demineralized water, 0.17 part of a 45% strength aqueous solution of a bis-sulfated dodecyldiphenyl oxide and 0.08 part of an adduct of 13 mol of ethylene oxide with 1 mol of a $C_{13}$-alcohol.

The components (a) to (c) are first heated to 90° C. and then emulsified in an aqueous phase, which is at 95° C., with high shearing by means of an Ultraturrax for 60 seconds, and immediately after the emulsification are cooled to room temperature using an ice bath. The emulsion thus obtainable has the stated properties. The viscosity was measured immediately after the preparation.

TABLE 3

| Viscosity at 20° C. | Deaerating activity in % by volume | Centrifuge test, filling height 75 mm 5000 rpm | Mean particle size distribution/Fraunhofer diffraction [μm] | Stability +30° C./ +5° C. 1 month |
|---|---|---|---|---|
| 50 mPas | 0.29 | 15 mn | 4.7 | creamed |

EXAMPLE 2

With the aid of an Ultraturrax, an oil-in-water emulsion is prepared in which the oil phase accounts for 50% by weight of the dispersion and has a mean particle size of 3.3 μm.

The oil phase consists of the following components:

(a) 205.6 parts of a fatty alcohol mixture comprising $C_{12}$- to $C_{24}$-alcohols (b) 8.0 parts of a polyglyceryl ester which is obtainable by esterifying a polyglycerol oil mixture comprising 27% of diglycerol, 44% of triglycerol, 19% of tetraglycerol and 10% of polyglycerols having a higher degree of condensation, and (c) 36.4 parts of glyceryl triesters of $C_{16}$- to $C_{18}$-fatty acids.

The aqueous phase consists of:

270 parts of demineralized water, 15.2 parts of a 39% strength aqueous, ammoniacal solution of an amphiphilic copolymer of 25 parts of acrylic acid and 75 parts of styrene (obtainable under the name Joncryl® L679, S. C. Johnson Polymer).

The components (a) to (c) are first heated to 90° C. and then emulsified in an aqueous phase, which is at 95° C., with high shearing by means of an Ultraturrax for 60 seconds, and immediately after the emulsification are cooled to room temperature using an ice bath. The emulsion thus obtainable has the stated properties. The viscosity was measured immediately after the preparation.

TABLE 4

| Viscosity at 20° C. | Deaerating activity in % by volume | Centrifuge test, filling height 75 mm 5000 rpm | Mean particle size distribution/Fraunhofer diffraction [μm] | Stability +30° C./ +5° C. 1 month |
|---|---|---|---|---|
| 2000 mPas | 0.3 | 5 mm | 3.3 μm | viscous |

We claim:

1. An antifoam and/or deaerator based on an oil-in-water dispersion which contains, in the hydrophobic oil phase, at least one compound effective as an antifoam and/or deaerator, wherein the oil-in-water dispersion contains from 0.01 to 3% by weight of a water-soluble, amphiphilic copolymer having acid groups or of a water-soluble salt thereof as a stabilizer, wherein the molar mass of the amphiphilic copolymers is from 1000 to 100,000.

2. An antifoam and/or deaerator as claimed in claim 1, which contains, as a stabilizer, at least one copolymer of (a) hydrophobic monoethylenically unsaturated monomers and (b) monoethylenically unsaturated carboxylic acids, monoethylenically unsaturated sulfonic acids, monoethylenically unsaturated phosphonic acids or a mixture thereof.

3. An antifoam and/or deaerator as claimed in claim 1, wherein the amphiphilic copolymers contain, as hydrophobic monoethylenically unsaturated monomers (a), styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or a mixture thereof as polymerized units.

4. An antifoam and/or deaerator as claimed in claim 1, wherein the copolymers contain, as hydrophilic monomers (b), acrylic acid, methacrylic acid, maleic acid, maleic anhydride, itaconic acid, vinylsulfonic acid, 2-acrylamidomethylpropanesulfonic acid, styrenesulfonic acid, vinylphosphonic acid or a mixture thereof as polymerized units.

5. An antifoam and/or deaerator as claimed in claim 1, wherein the molar mass of the amphiphilic copolymers is from 1500 to 10,000.

6. An antifoam and/or deaerator as claimed in claim 1, which contains from 0.1 to 1% by weight of an amphiphilic copolymer or of a water-soluble salt of such a copolymer.

7. An antifoam and/or deaerator as claimed in claim 1, wherein the copolymers contain (a) from 95 to 50% by weight of isobutene, diisobutene, styrene or a mixture thereof and (b) from 5 to 50% by weight of acrylic acid, methacrylic acid, maleic acid, or a mixture thereof as polymerized units.

8. An antifoam and/or deaerator as claimed in claim 1, wherein the copolymers contain (a) from 90 to 50% by weight of styrene, (b) from 10 to 50% by weight of acrylic acid.

9. A method of stabilizing antifoams and/or deaerators based on oil-in-water dispersions comprising:

mixing at least one compound effective as an antifoam and/or deaerator in the hydrophobic oil phase, and adding to the oil-in-water dispersion from 0.01 to 3% by weight of a water-soluble, amphiphilic copolymer having acid groups or of a water-soluble salt thereof as a stabilizer, wherein the molar mass of the amphiphilic copolymers is from 1000 to 100,000.

10. A method for defoaming and deaerating aqueous media comprising adding the antifoam and/or deaerator of claim 1 to an aqueous media in need thereof.

11. The method of claim 10, wherein said aqueous media in need thereof is an aqueous media used in a process selected from the group consisting of a papermaking process, a pulp digestion process, a pulp washing process, a paper stock beating process, and a pigment dispersion process.

12. The method of claim 10, the temperature of the aqueous media in need thereof is above 40° C.

13. A method of engine sizing and surface sizing of paper comprising adding the antifoam and/or deaerator of claim 1 to a paper stock.

* * * * *